United States Patent
Um et al.

(10) Patent No.: US 10,339,885 B2
(45) Date of Patent: Jul. 2, 2019

(54) ARRAY SUBSTRATE, DISPLAY DEVICE AND DRIVING METHOD THEREOF

(71) Applicant: BOE TECHNOLOGY GROUP CO., LTD., Beijing (CN)

(72) Inventors: Yoon Sung Um, Beijing (CN); Yun Sik Im, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/579,808

(22) PCT Filed: May 12, 2017

(86) PCT No.: PCT/CN2017/084109
§ 371 (c)(1),
(2) Date: Dec. 5, 2017

(87) PCT Pub. No.: WO2018/086325
PCT Pub. Date: May 17, 2018

(65) Prior Publication Data
US 2018/0357973 A1  Dec. 13, 2018

(30) Foreign Application Priority Data
Nov. 11, 2016  (CN) .......................... 2016 1 0994604

(51) Int. Cl.
*G09G 3/36* (2006.01)
*G02F 1/1343* (2006.01)
(Continued)

(52) U.S. Cl.
CPC ......... *G09G 3/3677* (2013.01); *G02F 1/1343* (2013.01); *G02F 1/1362* (2013.01);
(Continued)

(58) Field of Classification Search
CPC ......... G09G 3/3677; G09G 2300/0426; G09G 2310/067; G09G 2320/0223
(Continued)

(56) References Cited

U.S. PATENT DOCUMENTS 6,835,955 B2   12/2004  Iki et al.
6,855,955 B2 *  2/2005  Jeon ................. G02F 1/136213
                                                          257/59
(Continued)

FOREIGN PATENT DOCUMENTS

CN   1499468 A    5/2004
CN   1628264 A    6/2005
(Continued)

OTHER PUBLICATIONS

International Search Report of PCT/CN2017/084109 in Chinese, dated Aug. 17, 2017 with English translation.
(Continued)

*Primary Examiner* — Michael A Faragalla
*Assistant Examiner* — Sujit Shah
(74) *Attorney, Agent, or Firm* — Collard & Roe, P.C.

(57) ABSTRACT

An array substrate, a display device and a driving method thereof are provided. The array substrate includes a base substrate, a driver provided on the base substrate, a plurality of gate lines and a plurality of gate line overlap parts, each of the gate line overlap parts has a portion which overlaps a corresponding gate line of the gate lines in a direction perpendicular to the base substrate; the driver is connected with the plurality of the gate line overlap parts and is configured to, at one or both of a time when a potential of the gate line is changed from a turn-on potential to a turn-off potential and a time from the turn-off potential to the turn-on
(Continued)

potential, make the gate line overlap part in a floating state, or make the potential of the gate line overlap part equal to the changed potential.

20 Claims, 8 Drawing Sheets

(51) Int. Cl.
  *G02F 1/1362* (2006.01)
  *G02F 1/1368* (2006.01)

(52) U.S. Cl.
  CPC .......... *G02F 1/1368* (2013.01); *G09G 3/36* (2013.01); *G09G 2300/0426* (2013.01); *G09G 2310/067* (2013.01); *G09G 2320/0223* (2013.01)

(58) Field of Classification Search
  USPC ........................................ 345/208
  See application file for complete search history.

(56) References Cited

U.S. PATENT DOCUMENTS

| | | | |
|---|---|---|---|
| 2004/0178977 A1* | 9/2004 | Nakayoshi | G09G 3/3614 345/87 |
| 2007/0139572 A1 | 6/2007 | Lee | |
| 2011/0267295 A1* | 11/2011 | Noguchi | G06F 3/0416 345/173 |
| 2016/0093640 A1* | 3/2016 | Kawamura | H01L 27/124 257/72 |

FOREIGN PATENT DOCUMENTS

| | | |
|---|---|---|
| CN | 1983604 A | 6/2007 |
| JP | H04-255830 A | 9/1992 |

OTHER PUBLICATIONS

Notice of Transmittal of the International Search Report of PCT/CN2017/084109 in Chinese, dated Aug. 17, 2017.
Written Opinion of the International Searching Authority of PCT/CN2017/084109 in Chinese, dated Aug. 17, 2017 with English translation.

* cited by examiner

ARRAY SUBSTRATE, DISPLAY DEVICE AND DRIVING METHOD THEREOF

TECHNICAL FIELD

At least one of embodiments of the present disclosure relates to an array substrate, a display device and a driving method thereof.

BACKGROUND

Liquid crystal displays are the commonly used flat panel displays, and thin film transistor liquid crystal display (TFT-LCD) is the mainstream of the liquid crystal displays. Because the TFT-LCD has low cost, high yield and good display effect, it occupies the vast of market shares in the field of small and middle sized displays. Although the process of the TFT-LCD has gradually become mature, the image quality is still required to be continuously improved, so as to satisfy the critical demands of costumers. For example, a conventional wide view angle technology includes Fringe Field Switching (FFS) technology and Advanced-super Dimensional Switching (ADS) technology.

SUMMARY

At least one of embodiments of the disclosure relates to an array substrate, a display device and a driving method thereof, which can avoid gate signal delay resulting from influence on the gate signal by a gate line overlap part at an instant of gate signal jump.

At least one embodiment of the disclosure provides an array substrate, comprising: a base substrate; a plurality of gate lines provided on the base substrate; a plurality of gate line overlap parts provided on the base substrate and corresponding to the plurality of the gate lines in a one to one correspondence, each of the gate line overlap parts having a portion which overlaps a corresponding gate line of the gate lines in a direction perpendicular to the base substrate; and a driver, electrically connecting to the plurality of the gate line overlap parts and configured to, at one or both of a time when a potential of the gate line corresponding to a gate line overlap part is changed from a turn-on potential to a turn-off potential and a time when the gate line corresponding to the gate line overlap part is changed from the turn-off potential to the turn-on potential, make the gate line overlap part in a floating state, or make the potential of the gate line overlap part equal to the changed potential of the gate line corresponding to the gate line overlap part, wherein the changed potential comprises the turn-off potential which is changed from the turn-on potential or the turn-on potential which is changed from the turn-off potential.

At least one embodiment of the disclosure further provides a display device, comprising the array substrate according to the embodiment of the disclosure.

At least one embodiment of the disclosure further provides a driving method of a display device comprising an array substrate, and the array substrate comprising: a base substrate; a plurality of gate lines provided on the base substrate; and a plurality of gate line overlap parts provided on the base substrate and corresponding to the plurality of the gate lines in a one to one correspondence, each of the gate line overlap parts having a portion which overlaps a corresponding gate line of the gate lines in a direction perpendicular to the base substrate, wherein the driving method comprises: scanning the plurality of the gate lines in line sequence to display a frame of image; and at one or both of a time when a potential of the gate line corresponding to a gate line overlap part is changed from a turn-on potential to a turn-off potential and a time when the gate line corresponding to the gate line overlap part is changed from the turn-off potential to the turn-on potential, making the gate line overlap part in a floating state, or making the potential of the gate line overlap part equal to the changed potential of the gate line corresponding to the gate line overlap part, wherein the changed potential comprises the turn-off potential which is changed from the turn-on potential or the turn-on potential which is changed from the turn-off potential.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE SIGNS

100—base substrate; 101—gate line; 102—gate line overlap part; 1012—overlap portion; 103—driver; 104—gate line overlap part lead; 105—first thin film transistor; 106—second thin film transistor; 1051—gate electrode of first thin film transistor; 1052—source electrode of first thin film transistor; 1053—drain electrode of first thin film transistor; 1061—gate electrode of second thin film transistor; 1062—source electrode of second thin film transistor; 1063—drain electrode of second thin film transistor; 1020—common electrode; 1021—common electrode line; 1120—pixel electrode; 001—sub-pixel; 01—display region; 02—peripheral region; 107—drive unit; 108—first connection line; 109—second connection line; 0102—connection electrode; 10520—source electrode connection line; 10530—first drain electrode connection line; 10630—second drain electrode connection line.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
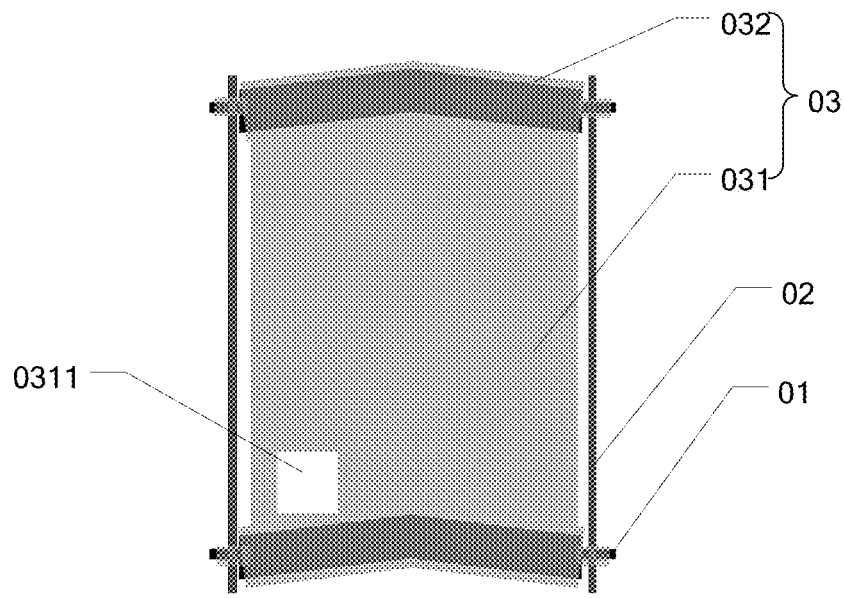
FIG. 1 is a schematic diagram of an array substrate.

In a thin film transistor liquid crystal display (TFT-LCD), liquid crystal is rotated for displaying by using an electric field formed between a pixel electrode and a common electrode. For example, in a liquid crystal display of Advanced-Super Dimensional Switching (ADS) mode or High Aperture Advanced Super Dimensional Switching (HADS) mode, as illustrated in FIG. 1, a gate line 01 extends in a horizontal direction, a data line 02 extends in a vertical direction, and a common electrode 03 comprises a main body section 031 (provided on a portion of a pixel region) and a section 032 for covering the gate line, so that an electric field is also formed between the pixel electrode 04 (not illustrated in FIG. 1 and please refer to FIG. 2) and the section of the common electrode for covering the gate line, to further improve the aperture ratio and the liquid crystal efficiency. The main body section 031 and the section 032 for covering the gate line of the common electrode are electrically connected and are commonly applied with a voltage. The gate line 01 is connected to the gate electrode, and is configured to input a signal to the gate electrode, so as to switch on the thin film transistor and transmit a signal to the pixel electrode connected with the drain electrode of the transistor. A hollow-out region 0311 of the main body section 031 of the common electrode can be used to connect the pixel electrode with the drain electrode of the thin film transistor which controls the pixel electrode, and providing the hollow-out region 0311 can avoid the common electrode and the pixel electrode to be connected. The pixel electrode and the common electrode are insulated from each other.

Figure 2:
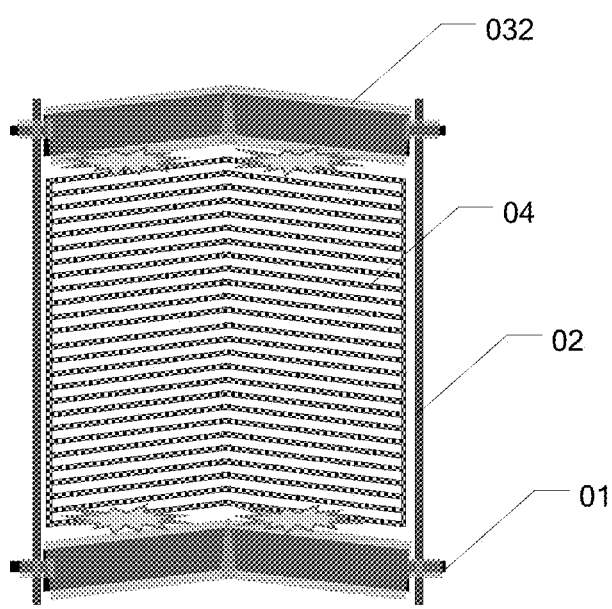
FIG. 2 is a schematic diagram of gate delay and light leakage resulting from an arraignment in which a part of a common electrode covers a gate line in the array substrate.

In FIG. 2, for clarified description, the main body section 031 of the common electrode 031 is omitted. Because the section 032 for covering the gate line of the common electrode is provided, the signal input to the gate line will be delayed, and liquid crystal deflection will be affected, resulting in light leakage and contrast ratio (CR) loss. Thus, it is required to decrease gate signal delay as much as possible.

Figure 3:
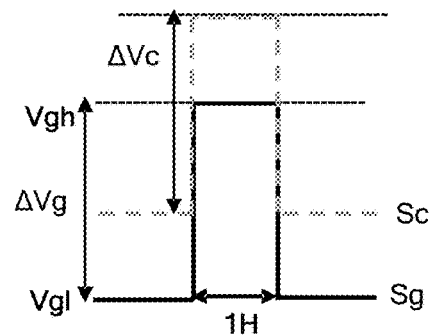
FIG. 3 is a schematic diagram of an ideal state (corresponding to a case of a common electrode having infinite resistance) of a signal input to the gate line and a signal input to the common electrode.
Figure 4:
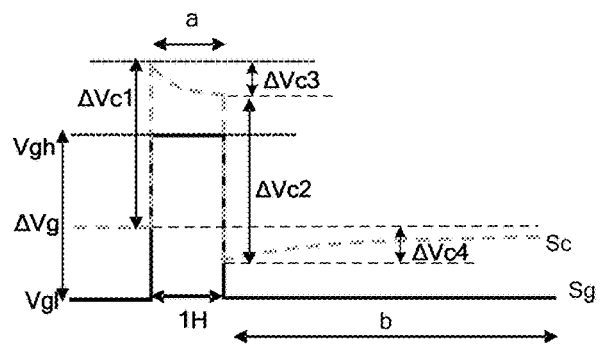
FIG. 4 is a schematic diagram of an ideal state of a signal input to the gate line and a signal input to the common electrode (corresponding to a case of the common electrode having relatively small resistance)

FIG. 3 illustrates a schematic diagram of an ideal status of a signal input to the gate line and a signal input to the common electrode. The black solid line represents a gate signal Sg, and the gray dashed line represents a common electrode signal Sc. In the ideal status, the time at which the gate signal Sg is changed from a turn-off potential Vgl to a turn-on potential Vgh is the time at which the common electrode signal Sc is changed from a turn-off potential to a turn-on potential, and the time at which the gate signal is changed from the turn-on potential Vgh to the turn-off potential Vgl is the time at which the common electrode signal Sc is changed from the turn-on potential to the turn-off potential. Generally, a jump voltage $\Delta Vg$ of the gate signal Sg is equal to or approximately equal to a jump voltage $\Delta Vc$ of the common electrode signal Sc. In the ideal status, no gate signal delay will occur. But, because, in the gate switch-on stage, the common electrode is applied with a signal and is not in a floating state, the voltage of the common electrode will be partially recovered in the gate switch-on stage (in the gate switch-on stage a, the voltage of the common electrode is decreased), as illustrated in FIG. 4. The turn-on potential Vgh, the turn-off potential Vgl, and the jump voltage $\Delta Vg$ of the gate signal are further illustrated in FIG. 4. The jump voltage $\Delta Vc1$, the recovered voltage $\Delta Vc3$, the jump voltage $\Delta Vc2$ and the recovered voltage $\Delta Vc4$ of the common electrode signal are further illustrated in FIG. 4. Generally, $\Delta Vg$ is equal to or approximately equal to $\Delta Vc2$, and $\Delta Vc1$ is equal to or approximately equal to $\Delta Vc2$. Vgl refers to the gate signal being in a low level (the turn-off potential), for example, and Vgh refers to the gate signal being in a high level (the turn-on potential), for example.

Figure 5:
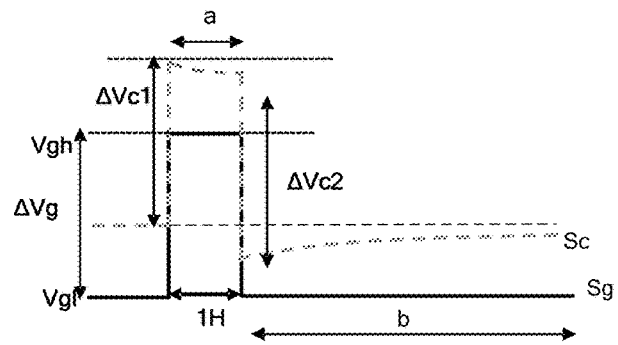
FIG. 5 is a schematic diagram of a signal input to the gate line and a signal input to the common electrode (corresponding to a case of the common electrode having relatively high resistance)

There is a close relationship between the recovery degree of the voltage of the common electrode and the resistance of the section 032 for covering the gate line of the common electrode. The recovery degree of the voltage of the common electrode in the gate switch-on stage is inversely proportional to the resistance of the section 032 for covering the gate line in this stage. If, in the gate switch-on stage, the resistance of the section 032 for covering the gate line of the common electrode is infinite (i.e. close to the ideal status), the voltage of the common electrode is less recovered (fall back) (less decreased) in the gate switch-on stage. If the resistance of the section 032 for covering the gate line of the common electrode is not infinite and is in a status of the resistance having a small value, the recovery (fall back) degree of the voltage of the common electrode in the gate switch-on stage is large (more decreased), as illustrated in FIG. 4. If the resistance of the section 032 for covering the gate line of the common electrode is not infinite, and is in a status of the resistance having a high value (between the small value and the infinite value), the recovery degree of the voltage of the common electrode in the gate switch-on stage is between the degree of FIG. 3 and the degree of FIG. 4, as illustrated in FIG. 5. For example, a status of applying a voltage to the section 032 for covering the gate line of the common electrode (applying a voltage, i.e. applying a voltage which value is not 0) can correspond to a status of the resistance of the section 032 for covering the gate line of the common electrode having a small value, and a status of not applying a voltage to the section 032 for covering the gate line of the common electrode (i.e. applying a voltage which value is 0) corresponds to a status of the resistance of the section 032 for covering the gate line of the common electrode having a high value. The status of not applying a voltage to the section 032 for covering the gate line of the common electrode corresponds to a floating state (high resistance status). The status of applying a voltage to the section for covering the gate line of the common electrode corresponds to a non-floating state (low resistance status, not high resistance status).

As illustrated in FIGS. 4 and 5, in the gate switch-on stage a, the section 032 for covering the gate line of the common electrode being in high resistance status will facilitate to decrease signal delay introduced by the section 032 for covering the gate line of the common electrode, and in the gate switch-off stage b, the section 032 for covering the gate line of the common electrode being in low resistance status will facilitate to recover the voltage of the common electrode, to further alleviate disadvantages introduced by this (for example, preventing light leakage resulting from distortion of the voltage of the common electrode). Thus, it can avoid or alleviate the problem of the voltage of the common electrode occurred when the gate signal delay happens, as much as possible, and can decrease the gate signal delay as much as possible. In FIGS. 3-5, 1H refers to a switch-on time interval of two adjacent gate lines, for example.

Figure 6:
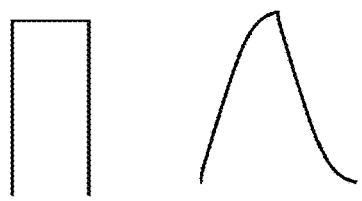
FIG. 6 is a schematic diagram of gate signal delay.

On the other hand, at time of the gate signal Sg being changed from the turn-off potential to the turn-on potential, because providing the section 032 for covering the gate line of the common electrode will also result in the gate signal delay, a charging problem will occur. Left side of FIG. 6 illustrates a case that a gate signal does not delay, and right side of FIG. 6 illustrates a case that both of rising edge (being changed from the turn-off potential to the turn-on potential) and falling edge (being changed from the turn-on potential to the turn-off potential) of the gate signal delay.

In following, this will be illustrated by several embodiments.

Embodiment 1

Figure 7:
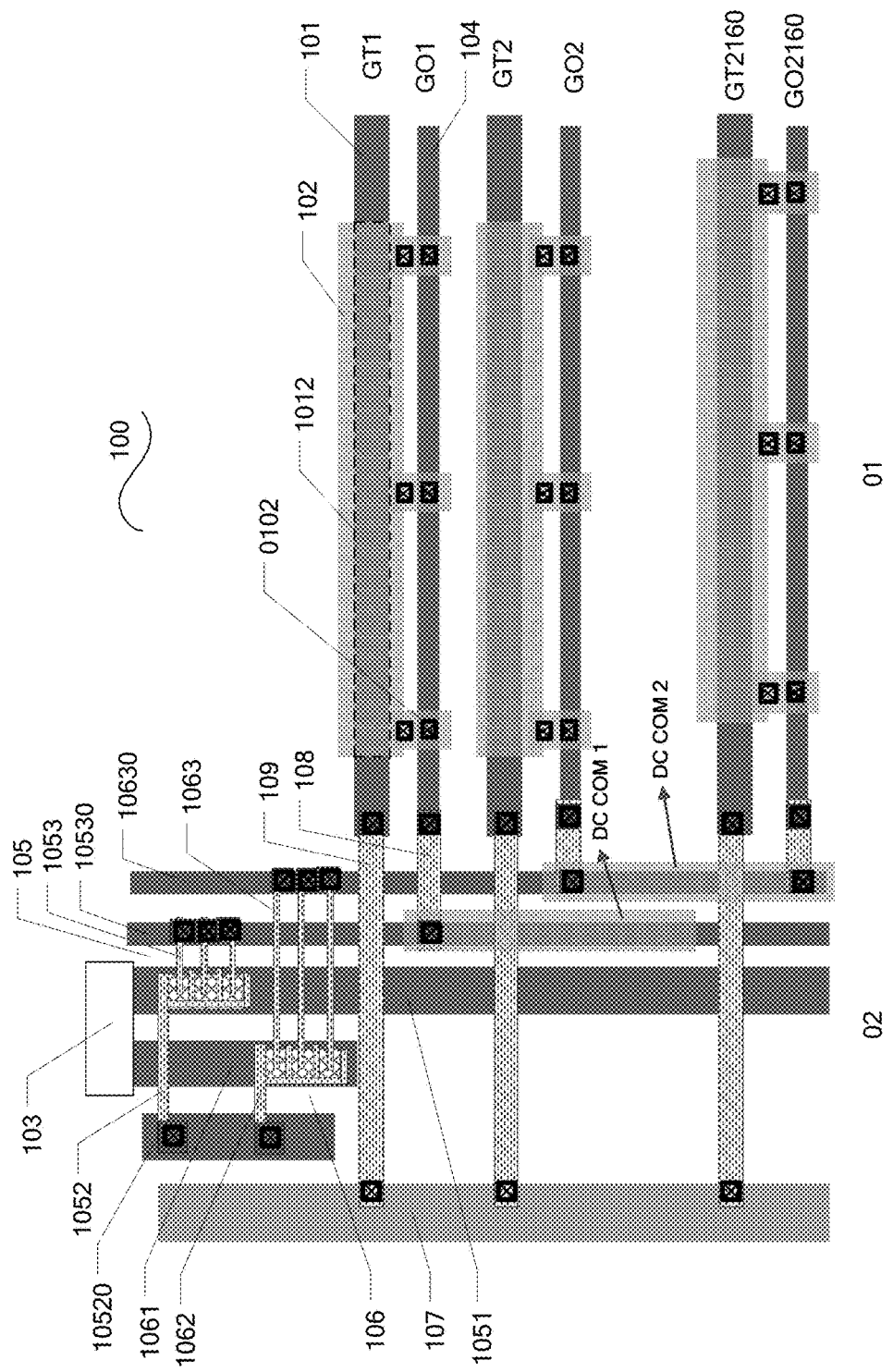
FIG. 7 is a schematic diagram of an array substrate provided by an embodiment of the disclosure.

As illustrated in FIG. 7, this embodiment provides an array substrate, comprising: a base substrate 100, a plurality of gate lines 101, provided on the base substrate 100; a plurality of gate line overlap parts 102, provided on the base substrate 100 and corresponding to the plurality of gate lines in a one to one correspondence, wherein each of the gate line overlap parts 102 has a overlap portion 1012 which overlaps a corresponding gate line 101 in a direction perpendicular to the base substrate 100; and a driver 103, electrically connected to the plurality of gate line overlap parts 102.

In one example, the driver 103 is configured to make the gate line overlap part 102 in a floating state, at a time of the gate line corresponding to the gate line overlap part 102 being changed from a turn-on potential to a turn-off potential, and/or, the driver 103 is configured to make the gate line overlap part 102 in the floating state, at a time of the gate line 101 corresponding to the gate line overlap part 102 being changed from the turn-off potential to the turn-on potential.

In another example, the driver 103 is configured to make the gate line overlap part 102 in the floating state, at the time of the gate line 101 corresponding to the gate line overlap part 102 being changed from the turn-on potential to the turn-off potential, and the driver 103 is further configured to apply a signal to the gate line overlap part 102 so that the gate line overlap part 102 is in a non-floating state, at the time of the gate line 101 corresponding to the gate line overlap part 102 being changed from the turn-off potential to the turn-on potential.

Thus, the gate signal delay resulting from the effects on the gate signal of the gate line overlap part 102 at an instant of gate signal jump (jump comprising being changed from the turn-on potential to the turn-off potential and/or being changed from the turn-off potential to the turn-on potential) is avoided. Harmful effects on display resulting from large fluctuations of the voltage on the gate line overlap part 102 are also reduced.

FIG. 7 illustrates a display region 01 and a peripheral region 02. The display region is configured to display, and the display region comprises a plurality of sub-pixel units arranged in a matrix (please refer to FIG. 9), each of the sub-pixel units comprising a TFT as a switch element. The peripheral region 02 is provided on at least one side of the display region 01. For example, the peripheral region 02 is configured to form a drive circuit for driving a component of the display region so as to make the display region to display.

For example, as illustrated in FIG. 7, the array substrate further comprises a plurality of gate overlap part leads 104, and the plurality of the gate overlap parts 102 correspond to the plurality of the gate line overlap part leads 104 in a one to one correspondence. For example, each of the gate line overlap parts 102 and the corresponding gate line over lap part lead 104 are located in a same row of sub-pixels. For example, the plurality of the gate line overlap part leads 104 is electrically connected to the driver 103. For example, the gate line overlap part 102 in an odd row is electrically connected to the driver 103 by a first thin film transistor 105, and the gate line overlap part 102 in an even row is electrically connected to the driver 103 by a second thin film transistor 106.

FIG. 7 illustrates a source electrode 1052 and a drain electrode 1053 of the first thin film transistor 105, and a source electrode 1062 and a drain electrode 1063 of the second thin film transistor 106. The source electrode 1052 and the source electrode 1062 can be electrically connected by a source electrode connection line 10520, to be commonly applied a source signal. But, the source electrode 1052 and the source electrode 1062 may be not electrically connected, so as to apply a source signal to the source electrode 1052 and the source electrode 1062 separately. For example, the drain electrode 1053 is electrically connected to a first drain electrode connection line 10530, and the gate line overlap part lead 104 in an odd row can be electrically connected to the first drain electrode connection line 10530 by a first connection line 108 corresponding to the gate line overlap part lead. For example, the drain electrode 1063 is electrically connected to a second drain electrode connection line 10630, and the gate line overlap part lead 104 in an even row can be electrically connected to the second drain electrode connection line 10630 by a first connection line 108 corresponding to the gate line overlap part lead. For example, the plurality of the gate line overlap part leads 104, the plurality of gate lines 101, the gate electrode 1051 of the first thin film transistor 105, the gate electrode 1061 of the second thin film transistor 106, the source electrode connection line 10520, the first drain electrode connection line 10530 and the second drain electrode connection line 10630 can be provided in a same layer.

FIG. 7 illustrates a $1^{st}$ gate line GT1, a $2^{nd}$ gate line GT2 . . . , a $2160^{th}$ gate line GT 2160, and correspondingly, FIG. 7 illustrates a $1^{st}$ gate line overlap part lead GO1, a $2^{nd}$ gate line overlap part GO2, . . . , a $2160^{th}$ gate line overlap part lead GO 2160. This is illustrated by this embodiment as an example, and other number of gate lines and other number of the gate line overlap part leads also can be adopted. The array substrate of the embodiment can be used to manufacture high definite and super high definite display device. The nth gate line is referred as GTn, and the nth gate line overlap part lead is referred as GOn. GTn corresponds to GOn. "n" is an integer larger than zero.

In the embodiment, a sequence of forming the gate line overlap part 102 and the gate line 101 is not limited. For example, the gate line overlap part 102 can be formed firstly and then the gate line is formed; also, the gate line can be formed firstly, and then the gate line overlap part 102 is formed.

For example, the plurality of the gate lines 101 is connected to the drive unit 107. For example, the plurality of the gate lines 101 can be connected to the drive unit 107 by corresponding second connection lines 109. The drive unit 107 can be a drive IC, for example, and a gate driver on array (GOA) also can be adopted.

Figure 8:
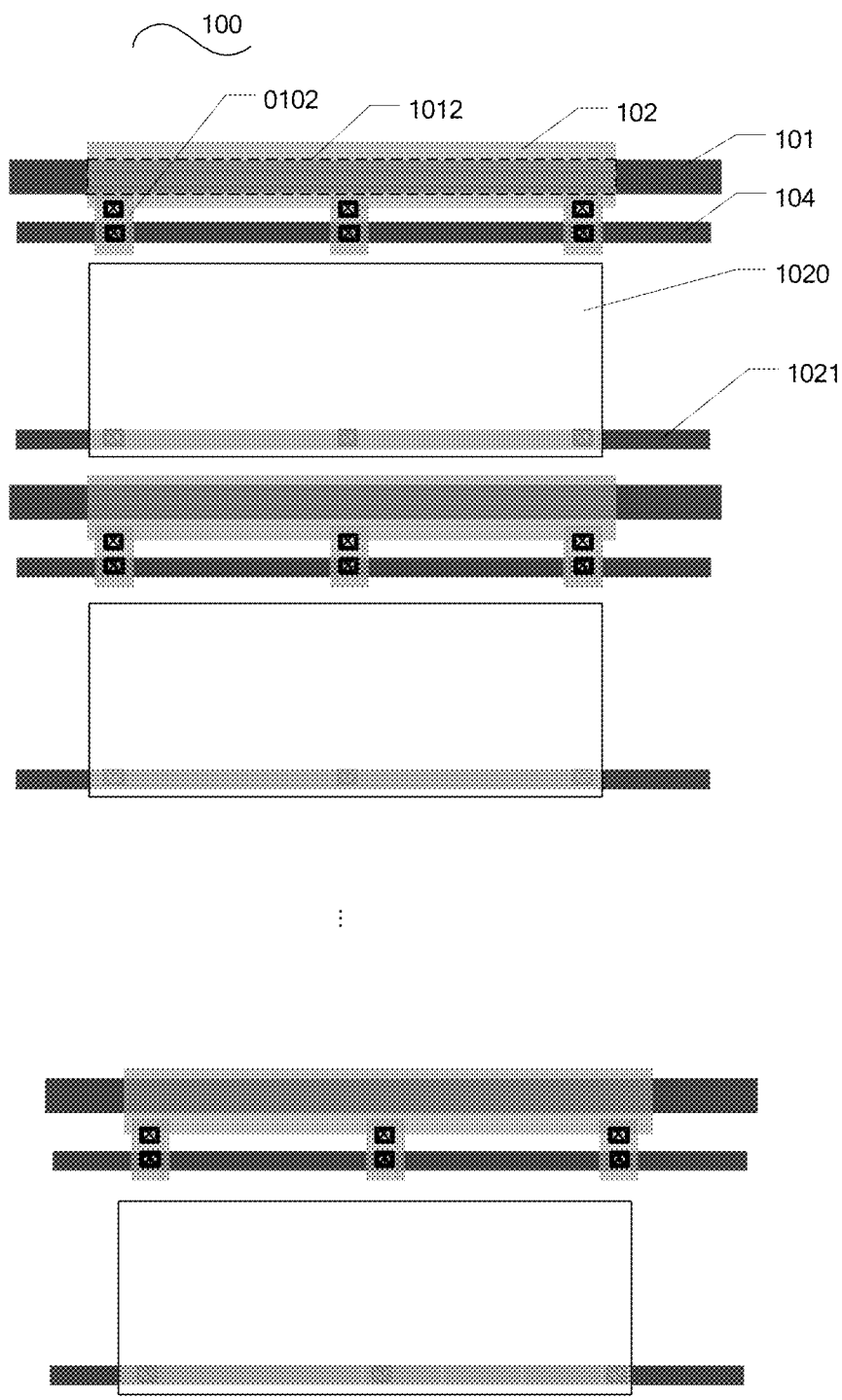
FIG. 8 is a schematic diagram of a portion of structure of a display region of an array substrate provided by an embodiment of the disclosure.

In one example, as illustrated in FIG. 8, the array substrate further comprises a common electrode 1020, and the plurality of the gate line overlap parts 102 and the common electrode 1020 are insulated from each other, so that signals can be applied to the gate line overlap parts 102 and the common electrode 102 separately. The common electrode 1020 can extend along a row direction as illustrated in FIG. 8 or along a column direction, and of course, other arrangement manner can also be adopted. The row direction refers to a horizontal direction parallel to a plane of paper surface, for example, and the column direction refers to a vertical direction parallel to a plane of paper surface, for example. For example, the common electrode 1020 and the common electrode line 1021 are electrically connected, an example arrangement of the common electrode line 1021 is illustrated in FIG. 8, i.e., extending along the row direction, and the common electrode line 1021 may not pass through the pixel region but provides on at least one side of the common electrode 1020.

Figure 9:
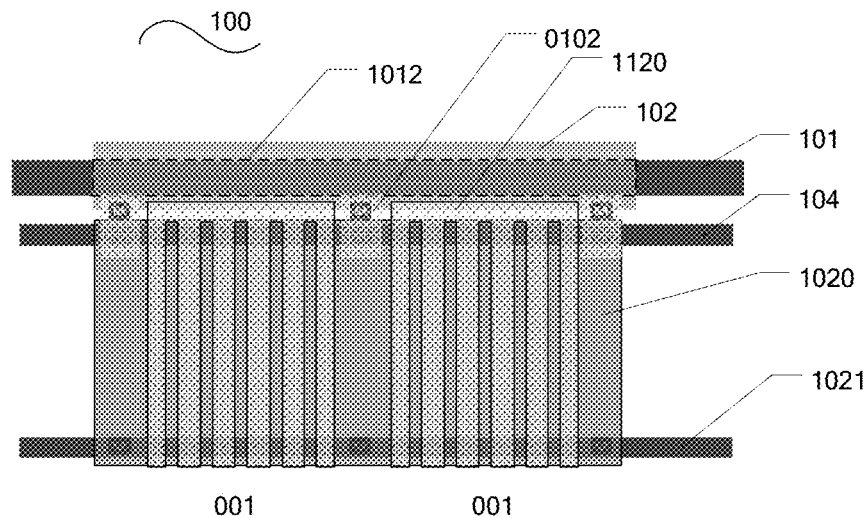
FIG. 9 is a schematic diagram of a portion of structure of a row of sub-pixels in a display region of an array substrate provided by an embodiment of the disclosure.

In one example, as illustrated in FIG. 8, the gate line overlap part 102 is connected to the gate line overlap part lead 104 by the connection electrode 0102. The gate line overlap part 102, the connection electrode 0102 and the common electrode 1020 can be formed in a same layer, so as to simplify process. In another example, as illustrated in FIG. 9, the gate line overlap part 102 and the common electrode 1020 are formed in a same layer, the pixel electrode 1120 is formed on the array substrate, and the connection electrode 0102 and the pixel electrode 1120 are formed in a same layer; or, the gate line overlap part 102 and the pixel electrode 1120 are formed in a same layer, and the connection electrode 0102 and the common electrode 1020 are formed in a same layer, so as to improve the aperture ratio and improve the liquid crystal efficiency. Two layers which are required to be electrically connected can implement electrical connection by via passing through an insulation layer. FIG. 9 illustrates two sub-pixels 001. FIG. 9 does not illustrate the electrical connection between the pixel electrode 1120 in the pixel region and the drain electrode of the thin film transistor for controlling the pixel electrode, and does not illustrate the hollow out region of the common electrode 1020 where the pixel electrode 1120 and the drain electrode are electrically connected, either. The pixel electrode 1120 and the common electrode 1020 are insulated from each other, the pixel electrode and the gate line overlap part 102 are insulated from each other, and the pixel electrode and the common electrode are configured to form an electric field to drive liquid crystal to rotate so as to display. In FIG. 9, the pixel electrode is positioned above the common electrode and forms slit electrodes, but the embodiment is not limited to this. Shape of the pixel electrode also can be adjusted to other shapes, and the common electrode 1020 can also be positioned above the pixel electrode 1120.

Embodiment 2

Figure 10:
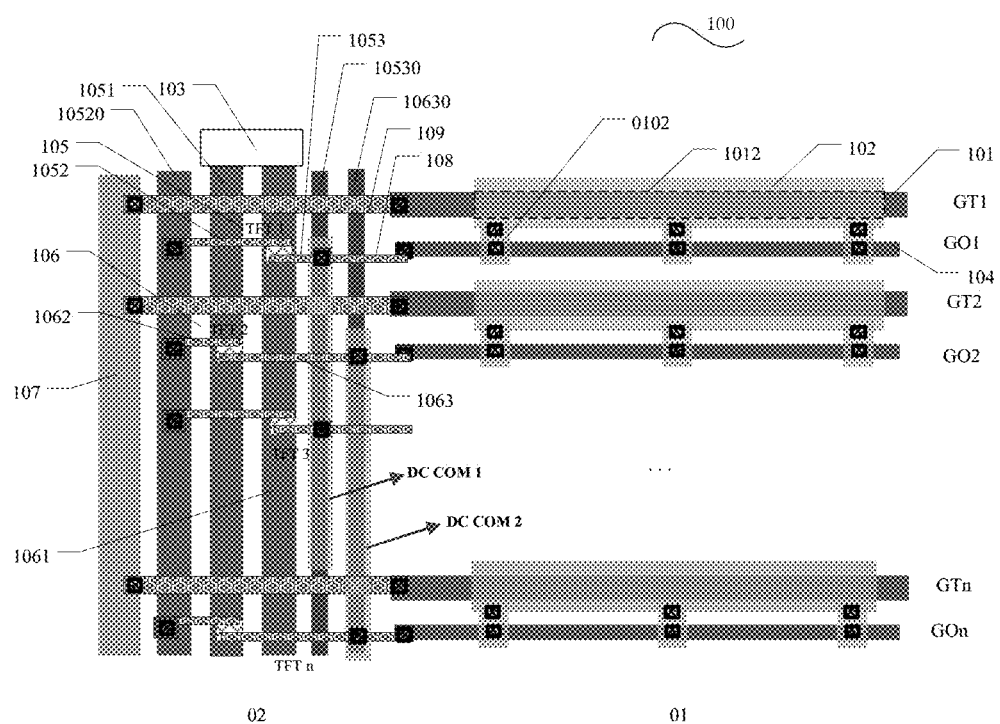
FIG. 10 is a schematic diagram of another array substrate provided by an embodiment of the disclosure.

The embodiment provides an array substrate. As illustrated in FIG. 10, it is different from the embodiment 1 in that, each of the gate line overlap part leads 104 is electrically connected to a thin film transistor, respectively, the source electrodes 1052 of the respective first thin film transistors 105 connected to the gate line overlap parts 102 in the odd row and the source electrodes 1062 of the respective second thin film transistors connected to the gate line overlap parts 102 in the even row are electrically connected by the source electrode connection line 10520. The gate electrodes of the respective first thin film transistors 105 connected to the gate line overlap parts 102 in the odd rows are electrically connected together, to form a gate electrode 1051, and the gate electrodes of the respective second thin film transistors 106 connected to the gate line overlap parts 102 in the even rows are electrically connected together, to form a gate electrode 1061. FIG. 10 illustrates TFT1 corresponding to a first row of sub-pixels, TFT2 corresponding to a second row of sub-pixels, TFT3 corresponding to a third row of sub-pixels, and TFTn corresponding to an nth row of sub-pixels.

For example, as illustrated in FIG. 10, the drain electrode 1053 of the first thin film transistor 105 in the odd row and the first drain electrode connection line 10530 are electrically connected, and the gate line overlap part lead 104 in the odd row are electrically connected to the first drain electrode connection line 10530 by a first connection line 108 corresponding to the gate line overlap part lead 104. For example, the drain electrode 1063 of the second thin film transistor 106 in the even row and the second drain electrode connection line 10630 are electrically connected, and the gate line overlap part lead 104 in the even line are electrically connected to the second drain electrode connection line 10630 by a first connection line 108 corresponding to the gate line overlap part lead 104.

For example, as illustrated in FIG. 10, the plurality of the gate line overlap part leads 104, the plurality of gate lines 101, the gate electrode 1051, the gate electrode 1061, the source electrode connection line 10520, the first drain electrode connection line 10530 and the second drain electrode connection line 10630 can be provided in a same layer.

It should be noted that, the drain electrodes 1053 of the thin film transistors 105 in the even rows may also be not electrically connected together. The drain electrodes 1063 of the thin film transistors 106 in the even rows may also be not electrically connected together.

Embodiment 3

The embodiment provides an array substrate, which is different from the embodiment 1 and embodiment 2 in that, the driver 103 is configured to make the potential of the gate line overlap part 102 equal to the turn-off potential of the gate line 101 corresponding to the gate line overlap part 102, at a time of the gate line 101 corresponding to the gate line overlap part 102 being changed from the turn-on potential to the turn-off potential. Thus, gate signal delay resulting from effects on the gate signal of the gate line overlap part 102 is avoided in at the instant of gate signal jump (being changed from the turn-on potential to the turn-off potential). Harmful effects on display resulting from large fluctuations of the voltage on the gate line overlap part 102 are also reduced.

For example, it can be implemented by advancing the changing time of the gate signal.

Embodiment 4

The embodiment provides an array substrate, which is different from the embodiment 3 in that, the driver 103 is configured to make potential of the gate line overlap part 102 equal to the turn-on potential of the gate line 101 corresponding to the gate line overlap part, at a time of the gate line 101 corresponding to the gate line overlap part 102 being changed from the turn-off potential to the turn-on potential. Thus, gate signal delay resulting from effects on the gate signal of the gate line overlap part is avoided at the instant of gate signal jump (being changed from the turn-off potential to the turn-on potential). Harmful effects on display resulting from large fluctuations of the voltage on the gate line overlap part 102 are also reduced.

For example, it can be implemented by advancing changing time of the gate signal.

Embodiment 5

The embodiment provides an array substrate which is a combination of embodiment 3 and embodiment 4. That is, the driver 103 is configured to make potential of the gate line overlap part 102 equal to the turn-off potential of the gate line 101 corresponding to the gate line overlap part, at the time of the gate line 101 corresponding to the gate line overlap part 102 being changed from the turn-on potential to the turn-off potential, and is configured to make potential of the gate line overlap part 102 equal to the turn-on potential of the gate line 101 corresponding to the gate line overlap part 102, at the time of the gate line 101 corresponding to the gate line overlap part 102 being changed from the turn-off potential to the turn-on potential. Thus, gate signal delay resulting from effects on the gate signal of the gate line overlap part is avoided at an instant of the gate signal jump. Harmful effects on display resulting from large fluctuations of the voltage on the gate line overlap part 102 are also reduced.

Embodiment 6

The embodiment provides a display device, comprising any array substrate of embodiment 1 to embodiment 5.

The display device of the embodiment can be liquid crystal display device of Advanced-super Dimensional Switching (ADS) mode, High Aperture Advanced Super Dimensional Switching (HADS) mode, and the like.

For example, the display device can be a display such as a liquid crystal device, and any products or components having displaying function and including a liquid crystal display, such as a television set, a digital camera, a cell phone, a watch, a tablet, a laptop, a navigator.

Embodiment 7

The embodiment provides a driving method, for driving a display device comprising the array substrate of embodiment 1 or embodiment 2. The method comprises: scanning a plurality of the gate lines 101 by line sequence to display a frame of image, and making the gate line overlap part 102 in a floating state at a time of the gate line 101 corresponding to the gate line overlap part 102 being changed from a turn-on potential to a turn-off potential; and/or, making the gate line overlap part 102 in the floating state, at a time of the gate line 101 corresponding to the gate line overlap part 102 being changed from the turn-off potential to the turn-on potential.

Thus, the gate signal delay resulting from influence on the gate signal by the gate line overlap part 102 is avoided at an instant of the gate signal jump (jump comprising being changed from a turn-on potential to a turn-off potential and/or being changed from a turn-off potential to a turn-on potential). Harmful effects on display resulting from large fluctuations of the voltage on the gate line overlap part 102 are also reduced.

In one example, a square wave signal is applied to the gate line overlap part 102. For example, the square wave signal is rectangular wave, the potential of low level signal of the square wave is 0 and the potential of high level signal of the square wave is larger than 0. In case that the square wave signal is the low level signal, the gate line overlap part 102 is in the floating state, and in case that the square wave signal is the high level signal, the gate line overlap part 102 is in a voltage input status. For example, the input voltage when the square wave signal is the high level signal can be equal to the voltage which the common electrode 102 is applied with.

For example, a switch-on interval of two adjacent gate lines is H. A time for each of the gate lines 101 being in the turn-on potential is at least 2H and is an integral multiple of H.

Figure 11:
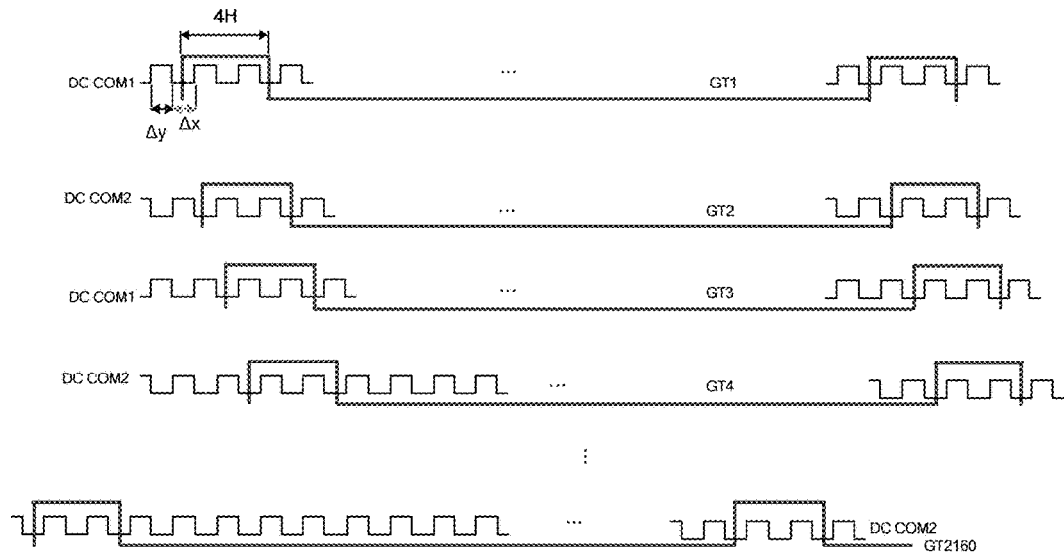
FIG. 11 is a schematic diagram of signals applied to a gate line overlap part and a gate line provided by an embodiment of the disclosure.

In one example, signals applied to respective gate lines 101 and gate line overlap parts 102 can be as illustrated in FIG. 11. For example, a first square wave signal (DC COM1) is applied to the gate line overlap parts 102 in the odd lines, and a second square wave signal (DC COM2) is applied to the gate line overlap parts 102 in the even lines, and the first square wave signal and the second square wave signal has the same frequency and are opposite in phase. A period of the first square wave and the second square wave is 2H. In the embodiment, an example in which a time for each of the gate lines 101 being in the turn-on potential is 4H and 5H is described for illustration, and the time can also be other numerical values, for example 2H, 3H and 7H etc. In FIG. 11, $\Delta x$ represents the time of the gate line overlap part 102 being in the floating state (not applying any signal to the gate line overlap part 102, or applying a signal which value is 0), and $\Delta y$ represents the time of the gate line overlap part 102 being in the non-floating state (applying a signal to the gate line overlap part 102, or applying a signal which value is not 0). In FIG. 11, a switch-on interval of two adjacent gate lines 101 is H, the time for each of the gate lines 101 being in the turn-on potential is 4H, and a period of the first square wave signal and the second square wave signal is 2H.

For example, the first square wave signal can be obtained by controlling the turn-on and turn-off states of the first thin film transistor 105. For example, the source electrode 1052 can be applied a constant external voltage, for example, EX DC 9V. The gate line overlap parts 102 in the odd lines are applied with the first square wave (DC COM1) by applying a continuous repeated signals from Vgh1 to Vgl1 (for example, Vgh1-Vgl1-Vgh1-Vgl1 . . . Vgh1-Vgl1, repeated) to the gate electrode 1051 of the first thin film transistor 105.

For example, the second square wave signal can be obtained by controlling the turn-on and turn-off states of the second thin film transistor 106, for example, EX DC 9V, but it is not limited to this. For example, the source electrode 1062 can be applied with a constant external voltage, for example, EX DC 9V. The gate line overlap parts 102 in the even lines are applied with the second square wave (DC COM2) by applying a continuous repeated signal from Vgl1 to Vgh1 (for example, Vgl1-Vgh1-Vgl1-Vgh1 . . . Vgl1-Vgh1, repeated) to the gate electrode 1061 of the second thin film transistor 105.

It should be noted that, the voltage applied to the source electrode 1052 and the source electrode 1062 is not limited to the illustrated cases. A manner of obtaining the first square signal and the second square signal is also not limited to the illustrated cases.

Figure 12:
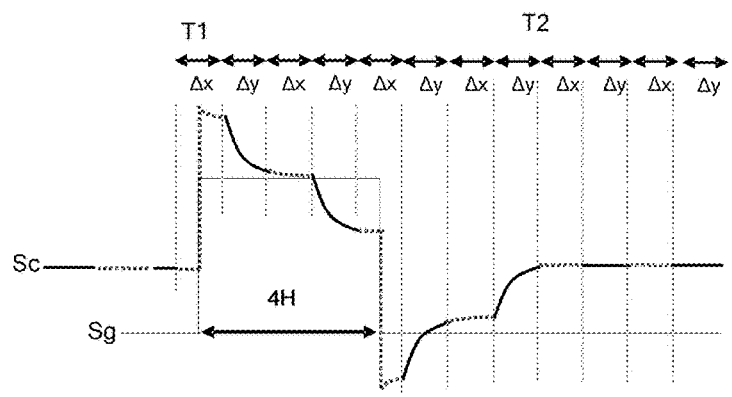
FIG. 12 is a schematic diagram of a voltage applied to the gate line overlap part and the gate line before a gate switch-on stage, during the gate switch-on stage and after the gate switch-on stage.

FIG. 12 illustrates change of the voltage of the gate line overlap part 102 before and after the gate line corresponding to the gate line overlap part 102 is switched on. It can be seen from FIG. 12 that, harmful effects on the gate signal introduced by providing the gate line overlap part 102 are almost avoided, because the gate line overlap part 102 is in the floating state at the time of gate signal jump.

On the other hand, it can be seen from FIG. 12 that, in the time period from T1 to T2, in the time period 4H of gate switch-on, the recovered numerical value of voltage in the time period Δx is very small, and the recovered numerical value of voltage of the gate line overlap part 102 in the time period Δx is much smaller than the recovered numerical value of voltage in the time period Δy. Thus, an overall voltage fall-back numerical value of the gate line overlap part 102 in the gate switch-on stage is reduced, which reduces harmful effects introduced by the large fluctuations of the voltage on the gate line overlap part 102. It also can be seen from FIG. 12 that, in the time period of gate switch-off stage, the recovered numerical value of voltage in the time period Δx is very small, and the recovered numerical value of voltage of the gate line overlap part in the time period Δx is much smaller than the recovered numerical value of voltage in the time period Δy. At the time T2, the voltage is totally recovered, and after time T2, the recovered voltage is maintained. Therefore, display effects resulting from providing the gate line overlap part 102 are reduced. Compared to not providing the gate line overlap part 102, the aperture ratio and liquid crystal efficiency can be improved. Compared to the gate line overlap part 102 and common electrode being electrically connected to be applied a same common voltage signal, harmful effects on display resulting from large fluctuations of voltage on the gate line overlap part 102 can be reduced, because the fluctuations of voltage on the gate line overlap part 102 are reduced. The harmful effects herein comprise light leakage, for example.

Figure 13:
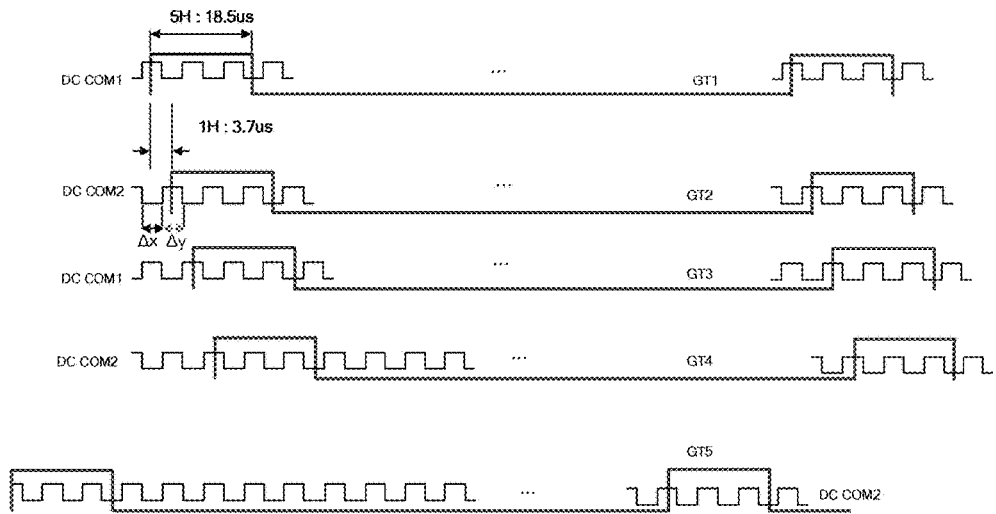
FIG. 13 is a schematic diagram of signals applied to the gate line overlap part and the gate line provided by another embodiment of the disclosure.
Figure 14:
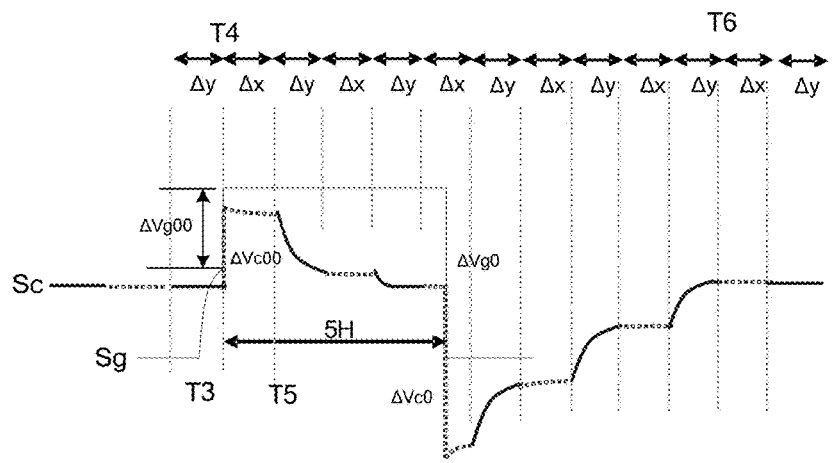
FIG. 14 is a schematic diagram of a voltage applied to the gate line overlap part and the gate line before a gate switch-on stage, during the gate switch-on stage and after the gate switch-on stage of FIG. 13.

In another example, as illustrated in FIG. 13, it is different from the above example in that, the time of each of the gate line 101 being in turn-on potential is 5H, and the gate line overlap part 102 is not in the floating state when the gate line 101 corresponding to the gate line overlap part 102 is changed from a turn-off potential to a turn-on potential. Only at the time of the gate line 101 corresponding to the gate line overlap part 102 being changed from the turn-on potential to the turn-off potential, the gate line overlap part 102 is in floating state. As illustrated in FIG. 14, in time period T3-T4, because the gate line overlap part 102 is not in the floating state, the gate line overlap part 102 will cause the delay of the gate signal, and in this stage, the voltage of the gate line overlap part 102 is almost not changed. In time T4, the gate line overlap part 102 is in the floating state, and variation magnitude ΔVg00 of the gate signal results in voltage variation (ΔVc00) of the gate line overlap part 102 occurring. In time period T4 to T5, the gate line overlap part 102 is in the floating state, and providing the gate line overlap part 102 will not delay the gate signal. Thus, signal delay can be partially alleviated, and effects on the charging problem can be decreased. If a GOA manner is adopted, the gate signal delay will not occur in the time period T3 to T4, and charging problem will not occur, because GOA switches on the gate signal in advance. Or, although the gate line delay exists, it has small effects on charging. In the time period T4 to T6, it can refer to time period T1 to T2, and will not be repeated herein. In FIG. 14, on the rising edge, a voltage variation numerical value ΔVg00 of the gate signal can be equal to or approximately equal to a voltage variation numerical value ΔVc00 of the gate line overlap part 102. On the falling edge, a voltage variation numerical value ΔVc0 of the gate line overlap part 102 can be equal to or approximately equal to the voltage variation numerical value ΔVg0 of the gate signal.

In FIGS. 12 and 13, DC COM1 and DC COM2 are continuous, and middle disconnected portion of them is omitted. In FIG. 13, 1H=3.7 μs is taken as an example for description, 1H also can adopt other time, and this is not limited by the embodiment.

For example, as illustrated in FIGS. 12 and 14, high level signal of DC COM1 and DC COM2 can be larger than the turn-on potential of the gate signal, but it is not limited to this.

Embodiment 8

The embodiment provides a driving method, which can be used for driving a display device comprising the array substrate of the embodiment 3. The method comprises: scanning the plurality of the gate lines 101 by line sequence to display a frame of image, and making potential of the gate line overlap part 102 equal to the turn-off potential of the gate line 101 corresponding to the gate line overlap part 102 at the time of the gate line 101 corresponding to the gate line overlap part 102 being changed from a turn-on potential to the turn-off potential.

Thus, the gate signal delay resulting from influence on the gate signal by the gate line overlap part is avoided at an instant of gate signal jump (being changed from the turn-on potential to the turn-off potential). Harmful effects on display resulting from large fluctuations of the voltage on the gate line overlap part 102 are also reduced.

For example, the potential of the gate line overlap part 102 is made equal to the turn-on potential of the gate line 101 corresponding to the gate line overlap part 102 by applying a signal to the gate line overlap part 102.

For example, before the gate line 101 corresponding to the gate line overlap part 102 is changed from the turn-on potential to the turn-off potential, the signal applied to the gate line overlap part 102 is adjusted, so that the potential of the gate line overlap part 102 is equal to the turn-off potential of the gate line 101 corresponding to the gate line overlap part 102, at the time of the gate line 101 corresponding to the gate line overlap part 102 being changed from the turn-on potential to the turn-off potential.

It should be noted that, in addition to driving the display device comprising the array substrate of the embodiment 3, the method of the embodiment can be used to driving a conventional display device, and corresponding effects can be achieved. For example, the method of the embodiment can also be used to drive a display device comprising following structure: the gate line overlap part 102 and the common electrode are electrically connected together, to be applied a same common voltage signal.

Figure 15:
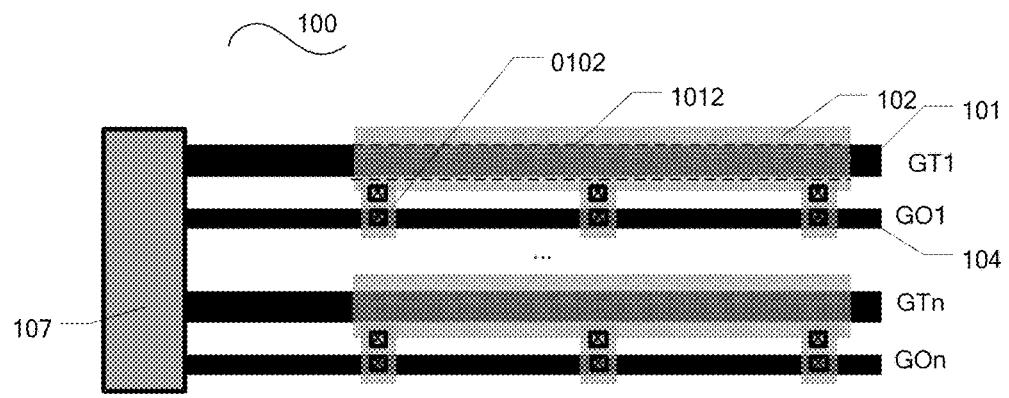
FIG. 15 is a schematic diagram of an array substrate provided by another embodiment of the disclosure.

For example, the array substrate of the display device can be as illustrated in FIG. 15. Reference signs of FIG. 15 can be the same as above mentioned.

Embodiment 9

The embodiment provides a driving method, which is used for driving a display device comprising the array substrate of the embodiment 4. The method comprises: scanning the plurality of the gate lines 101 by line sequence to display a frame of image, and making potential of the gate line overlap part 102 equal to a turn-on potential of the gate line 101 corresponding to the gate line overlap part 102, at the time of the gate line overlap part 102 corresponding to the gate line overlap part 102 being changed from a turn-off potential to the turn-on potential.

Thus, the gate signal delay resulting from effects on the gate signal of the gate line overlap part 102 is avoided at an instant of gate signal jump (being changed from the turn-off potential to the turn-on potential). Harmful effects on display resulting from large fluctuations of the voltage on the gate line overlap part 102 can also be reduced.

For example, the potential of the gate line overlap part 102 is made equal to the turn-on potential of the gate line 101 corresponding to the gate line overlap part 102 by applying a signal to the gate line overlap part 102.

For example, before the gate line 101 corresponding to the gate line overlap part 102 is changed from the turn-off potential to the turn-on potential, the signal applied to the gate line overlap part 102 is adjusted, so that the potential of the gate line overlap part 102 is equal to the turn-on potential of the gate line 101 corresponding to the gate line overlap part 102, at the time of the gate line 101 corresponding to the gate line overlap part 102 being changed from the turn-off potential to the turn-off potential.

It should be noted that, in addition to driving the display device comprising the array substrate of the embodiment 4, the method of the embodiment can be used to driving a conventional display device, and corresponding effects can be achieved. For example, the method of the embodiment can also be used to drive a display device comprising following structure: in the array substrate comprised in the display device, the gate line overlap part 102 and the common electrode are electrically connected together to be applied with a same common voltage signal.

For example, the array substrate of the display device can be as illustrated in FIG. 15. Reference signs of FIG. 15 can be the same as above mentioned.

Embodiment 10

The embodiment provides a driving method, which is used for driving a display device comprising the array substrate of the fifth embodiment. The method comprises: scanning the plurality of the gate lines 101 by line sequence to display a frame of image, and making potential of the gate line overlap part 102 equal to a turn-off potential of the gate line 101 corresponding to the gate line overlap part 102, at the time of the gate line 101 corresponding to the gate line overlap part 102 being changed from a turn-on potential to the turn-off potential; and making the potential of the gate line overlap part 102 equal to the turn-on potential of the gate line 101 corresponding to the gate line overlap part 102, at the time of the gate line corresponding to the gate line overlap part 102 being changed from the turn-off potential to the turn-on potential.

Thus, the gate signal delay resulting from effects on the gate signal of the gate line overlap part 102 is avoided at an instant of gate signal jump (being changed from the turn-on potential to the turn-off potential and/or being changed from the turn-off potential to the turn-on potential). Harmful effects on display resulting from large fluctuations of the voltage on the gate line overlap part 102 can also be reduced.

For example, before the gate line 101 corresponding to the gate line overlap part 102 is changed from the turn-on potential to the turn-off potential, the signal applied to the gate line overlap part 102 is adjusted, so that the potential of the gate line overlap part 102 is equal to the turn-off potential of the gate line 101 corresponding to the gate line overlap part 102, at time of the gate line 101 corresponding to the gate line overlap part 102 being changed from the turn-on potential to the turn-off potential.

For example, before the gate line 101 corresponding to the gate line overlap part 102 is changed from the turn-off potential to the turn-on potential, the signal applied to the gate line overlap part 102 is adjusted, so that the potential of the gate line overlap part 102 is equal to the turn-on potential of the gate line 101 corresponding to the gate line overlap part 102, at the time of the gate line 101 corresponding to the gate line overlap part 102 being changed from the turn-off potential to the turn-on potential.

Figure 16:
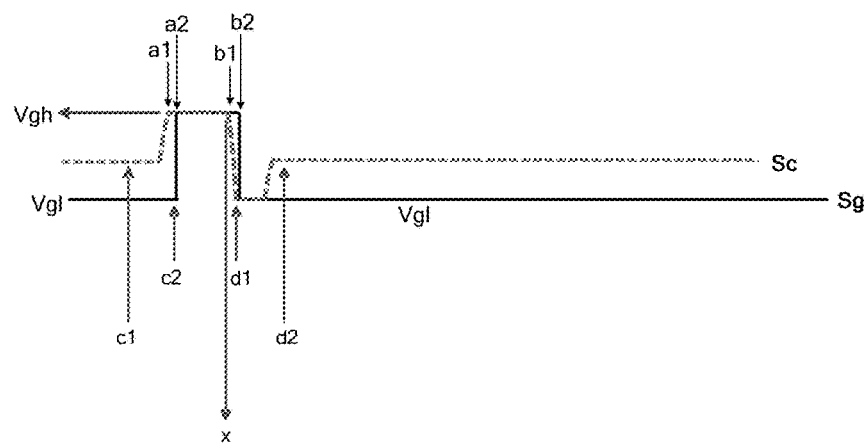
FIG. 16 is schematic diagram of a driving method provided by another embodiment of the disclosure.

In one example, as illustrated in FIG. 16, in order to prevent the gate signal delay, the time for the gate line overlap part 102 to change signals applied is advanced. Gate signal Sg and the gate line overlap signal Sc, a1, a2, b1, b2, c1, c2, d1, d2 are at different times. a2−a1>0, and b2−b1>0. For example, the time for changing the signal for the gate line overlap part 102 can be advanced as a whole. At time "c2" (time of gate signal being changed from the turn-off potential to the turn-on potential, when Vgl→Vgh), because the voltage of the gate line overlap part 102 has been in Vgh status and the gate line overlap part 102 and the gate line 101 corresponding to the gate line overlap part 102 have equal potential, no capacitance will be formed between the gate line overlap part 102 and the gate line 101 corresponding to the gate line overlap part, and no gate signal delay will occur. At the time "d1" (time of gate signal being changed from the turn-on potential to the turn-off potential, when Vgh→Vgl), because the voltage of the gate line overlap part 102 has been in Vgl status, and the gate line overlap part 102 and the gate line 101 corresponding to the gate line overlap part 102 have equal potential, no capacitance will be formed between the gate line overlap part 102 and the gate line 101 corresponding to the gate line overlap part 102, and no gate signal delay will occur.

For example, in order to achieve above effects, at the time c1, in internal of GATE I/C, GTn and GOn have different voltages, and power sources are separated; at the time c2, GTn and GOn have the same voltage, and can adopt the same power source; at the time x, GTn having a voltage of Vgh is separated from GOn having a voltage of Vgl, and their voltages are separated; at the time d1, GTn and GOn have the same voltage, and can adopt the same power source; at the time d2, GTn and GOn have different voltages, and their voltages are separated.

In the array substrate, the display device and the driving method of the embodiments of the disclosure, the driver 103 can adopt a drive IC, and it is not limited to this.

The following statements should be noted:

(1) Unless otherwise defined, the same reference sign represents the same meaning in the embodiments of the disclosure and accompanying drawings.

(2) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, the thickness and size of a layer or a structure may be enlarged. However, it should understood that, in the case in which a component or element such as a layer, film, area, substrate or the like is referred to be "on" or "under" another component or element, it may be directly on or under the another component or element or a component or element is interposed there between.

(4) In case of no conflict, features in one embodiment or in different embodiments can be combined.

What are described above is the embodiments of the disclosure only and not limitative to the scope of the disclosure; any of those skilled in related arts can easily conceive variations and substitutions in the technical scopes disclosed by the disclosure, which should be encompassed in protection scopes of the disclosure. Therefore, the scopes of the disclosure should be defined in the appended claims.

The application claims priority to the Chinese patent application No. 201610994604.1, filed Nov. 11, 2016, the entire disclosure of which is incorporated herein by reference as part of the present application.

The invention claimed is:

1. A driving method of a display device comprising an array substrate, and the array substrate comprising: a base substrate;
a plurality of gate lines provided on the base substrate; a plurality of gate line overlap parts provided on the base substrate and corresponding to the plurality of the gate lines in a one to one correspondence, each of the gate line overlap parts having a portion which overlaps a corresponding gate line of the gate lines in a direction perpendicular to the base substrate, a pixel electrode provided on the base substrate; and a common electrode located between two adjacent gate line overlap parts, the common electrode being configured to form an electric field with the pixel electrode, wherein the two adjacent gate line overlap parts are both insulated from the pixel electrode and insulated from the common electrode;
wherein the driving method comprises:
scanning the plurality of the gate lines in line sequence to display a frame of image; and
at one or both of a time when a potential of the gate line corresponding to a gate line overlap part is changed from a turn-on potential to a turn-off potential and a time when the gate line corresponding to the gate line overlap part is changed from the turn-off potential to the turn-on potential, making the gate line overlap part in a floating state, or making the potential of the gate line overlap part equal to the changed potential of the gate line corresponding to the gate line overlap part, wherein the changed potential comprises the turn-off potential which is changed from the turn-on potential or the turn-on potential which is changed from the turn-off potential.

2. The driving method of claim 1, wherein, at the time when the potential of the gate line corresponding to the gate line overlap part is changed from the turn-on potential to the turn-off potential, making the gate line overlap part in the floating state; and at the time of the gate line corresponding to the gate line overlap part is changed from the turn-off potential to the turn-on potential, applying a signal to the gate line overlap part.

3. The driving method of claim 1, wherein applying a square wave signal to the gate line overlap part, so that the gate line overlap part is in the floating state at one or both of the time when the potential of the gate line corresponding to the gate line overlap part is changed from the turn-on potential to the turn-off potential and the time when the gate line corresponding to the gate line overlap part is changed from the turn-off potential to the turn-on potential.

4. The driving method of claim 3, wherein the square wave signal is a rectangular wave, a potential of a low level signal of the square wave is 0 and a potential of a high level signal of the square wave is larger than 0, in case that the square wave signal is the low level signal, the gate line overlap part is in the floating state, and in case that the square wave signal is the high level signal, the gate line overlap part is in a state of being input with a voltage.

5. The driving method of claim 3, wherein a first square wave signal is applied to the gate line overlap part in an odd row, a second square wave signal is applied to the gate line overlap part in an even row, and the first square wave signal and the second square wave signal has a same frequency and are opposite in phase.

6. The driving method of claim 5, wherein a switch-on interval of two adjacent gate lines is H, a time of each of the gate lines being in the turn-on potential is at least 2H and is integral multiple of H, and a period of the first square wave and the second square wave is 2H.

7. The driving method of claim 1, wherein adjusting the signal applied to the gate line overlap part, so that the potential of the gate line overlap part is equal to the changed potential of the gate line corresponding to the gate line overlap part, at one or both of the time when the potential of the gate line corresponding to the gate line overlap part is changed from the turn-on potential to the turn-off potential and the time when the gate line corresponding to the gate line overlap part is changed from the turn-off potential to the turn-on potential.

8. The driving method of claim 7, wherein before the gate line corresponding to the gate line overlap part is changed from the turn-on potential to the turn-off potential, adjusting the signal applied to the gate line overlap part, so that the potential of the gate line overlap part is equal to the turn-off potential of the gate line corresponding to the gate line overlap part at the time of the gate line corresponding to the gate line overlap part is changed from the turn-on potential to the turn-off potential.

9. The driving method of claim 7, wherein before the gate line corresponding to the gate line overlap part is changed from the turn-off potential to the turn-on potential, adjusting the signal applied to the gate line overlap part, so that the potential of the gate line overlap part is equal to the turn-on potential of the gate line corresponding to the gate line overlap part at the time of the gate line corresponding to the gate line overlap part is changed from the turn-off potential to the turn-on potential.

10. The driving method of claim 1, wherein the driving method comprises: separately applying signals to the common electrode and the two adjacent gate line overlap parts.

11. An array substrate, comprising:
a base substrate;
a plurality of gate lines provided on the base substrate;
a plurality of gate line overlap parts provided on the base substrate and corresponding to the plurality of the gate lines in a one to one correspondence, each of the gate line overlap parts having a portion which overlaps a corresponding gate line of the gate lines in a direction perpendicular to the base substrate;
a driver, electrically connecting to the plurality of the gate line overlap parts and configured to, at one or both of a time when a potential of the gate line corresponding to a gate line overlap part is changed from a turn-on potential to a turn-off potential and a time when the gate line corresponding to the gate line overlap part is changed from the turn-off potential to the turn-on potential, make the gate line overlap part in a floating state, or make the potential of the gate line overlap part equal to the changed potential of the gate line corresponding to the gate line overlap part, wherein the changed potential comprises the turn-off potential which is changed from the turn-on potential or the turn-on potential which is changed from the turn-off potential;
a pixel electrode provided on the base substrate; and
a common electrode, located between two adjacent gate line overlap parts, configured to form an electric field with the pixel electrode,
wherein the two adjacent gate line overlap parts are both insulated from the pixel electrode and insulated from the common electrode.

12. The array substrate of claim 11, further comprising a plurality of gate line overlap part leads, wherein the plurality of the gate line overlap parts correspond to the plurality of the gate line overlap part leads in a one to one correspondence, and each of the gate line overlap parts and a corresponding gate line overlap part lead of the gate line overlap part leads are electrically connected, respectively.

13. The array substrate of claim 12, wherein the gate line overlap part in an odd row is connected to the driver by a first thin film transistor, and the gate line overlap part in an even row is connected the driver by a second thin film transistor.

14. The array substrate of claim 13, wherein the plurality of the gate line overlap part leads, the plurality of gate lines, a gate of the first thin film transistor, and a gate of the second thin film transistor are located in a same layer.

15. The array substrate of claim 12, wherein each of the gate line overlap part leads is connected to the driver by a thin film transistor, respectively, source electrodes of respective thin film transistors are electrically connected together, gate electrodes of the respective thin film transistors connected to the gate line overlap parts in odd rows are electrically connected together; and gate electrodes of respective thin film transistors connected to the gate line overlap parts in even rows are electrically connected together.

16. The array substrate of claim 15, wherein the plurality of the gate line overlap part leads, the plurality of gate lines, the gate electrodes of the respective thin film transistors connected to the gate line overlap parts in the odd rows and the gate electrodes of the respective thin film transistors connected to the gate line overlap parts in the even rows are located in a same layer.

17. An array substrate, comprising:
a base substrate;
a plurality of gate lines provided on the base substrate;
a plurality of gate line overlap parts provided on the base substrate and corresponding to the plurality of the gate lines in a one to one correspondence, each of the gate line overlap parts having a portion which overlaps a corresponding gate line of the gate lines in a direction perpendicular to the base substrate; and
a driver, electrically connecting to the plurality of the gate line overlap parts and configured to, at one or both of a time when a potential of the gate line corresponding to a gate line overlap part is changed from a turn-on potential to a turn-off potential and a time when the gate line corresponding to the gate line overlap part is changed from the turn-off potential to the turn-on potential, make the gate line overlap part in a floating state, or make the potential of the gate line overlap part equal to the changed potential of the gate line corresponding to the gate line overlap part, wherein the changed potential comprises the turn-off potential which is changed from the turn-on potential or the turn-on potential which is changed from the turn-off potential;
the array substrate further comprising a common electrode, wherein the plurality of the gate line overlap parts and the common electrode are insulated from each other.

18. The array substrate of claim 17, further comprising a common electrode line, wherein the common electrode and the common electrode line are electrically connected.

19. The array substrate of claim 11, wherein the driver is configured to make the gate line overlap part in the floating state at the time of the gate line corresponding to the gate line overlap part is changed from the turn-on potential to the turn-off potential, and the driver is further configured to apply a signal to the gate line overlap part so that the gate line overlap part is in a non-floating state at the time of the gate line corresponding to the gate line overlap part is changed from the turn-off potential to the turn-on potential.

20. A display device, comprising the array substrate of claim 11.

* * * * *